Figure 1:
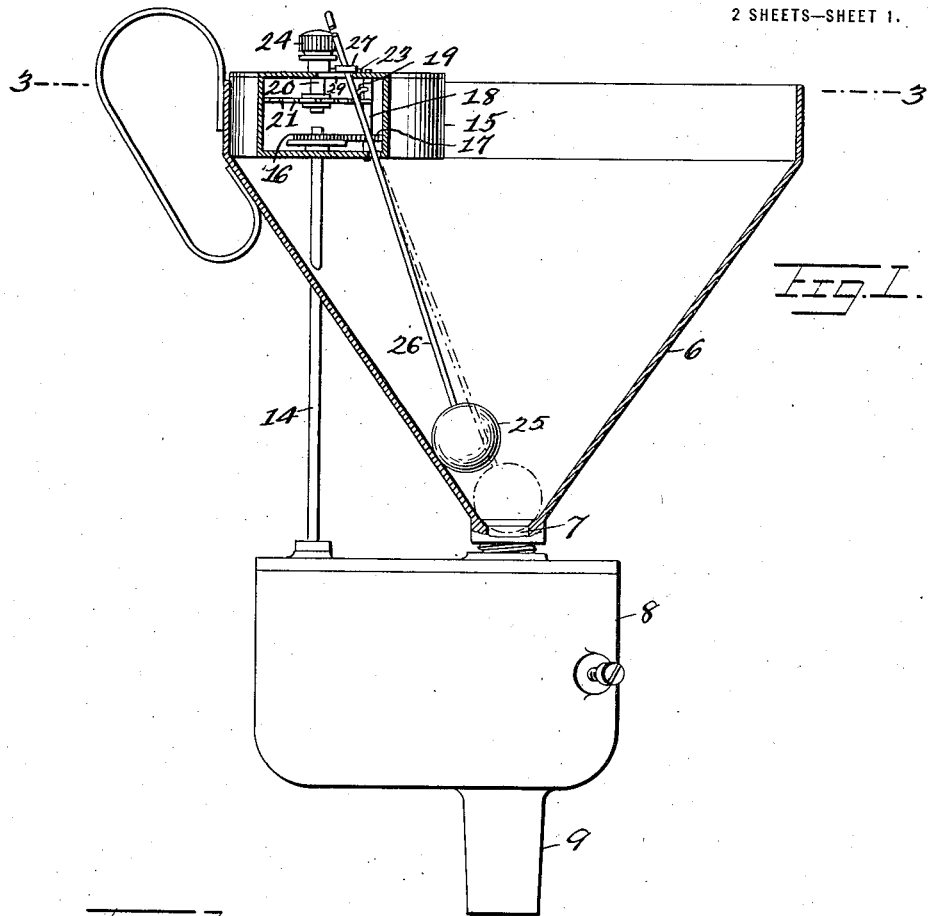

R. DE LA ROSA.
MEASURING FUNNEL.
APPLICATION FILED OCT. 19, 1914.

1,165,130.

Patented Dec. 21, 1915.
2 SHEETS—SHEET 1.

WITNESSES
H. J. Walker
J. C. Larelu

INVENTOR
Rosales de la Rosa
BY Munn & Co.
ATTORNEYS

R. DE LA ROSA.
MEASURING FUNNEL.
APPLICATION FILED OCT. 19, 1914.
1,165,130.
Patented Dec. 21, 1915.
2 SHEETS—SHEET 2.
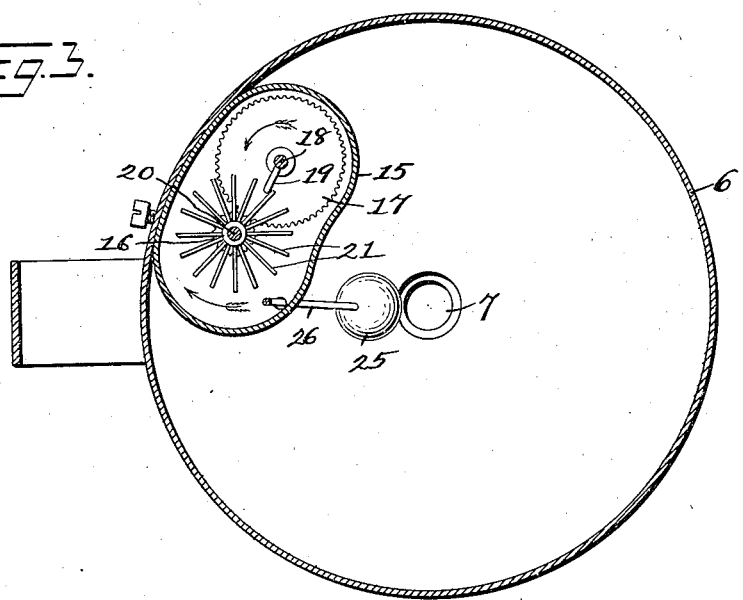
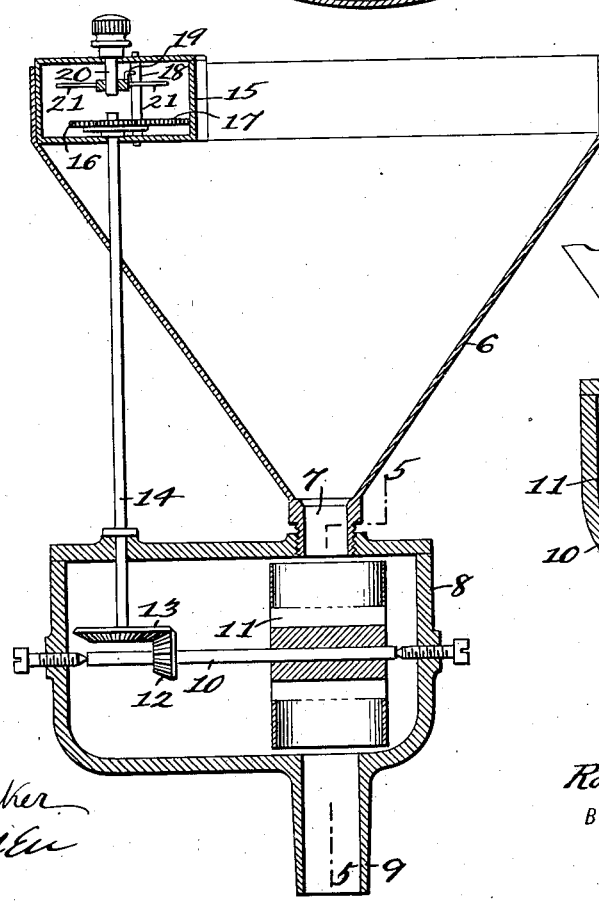
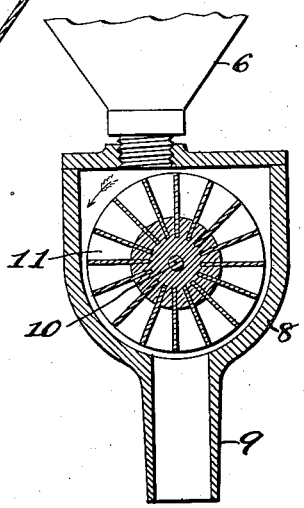
WITNESSES
H. D. Walker
J. E. Larsen
INVENTOR
Rosales de la Rosa
BY
ATTORNEYS

UNITED STATES PATENT OFFICE.

ROSALES DE LA ROSA, OF NEW YORK, N. Y.

MEASURING-FUNNEL.

1,165,130.  Specification of Letters Patent.  Patented Dec. 21, 1915.

Application filed October 19, 1914. Serial No. 867,352.

*To all whom it may concern:*

Be it known that I, ROSALES DE LA ROSA, a citizen of the Republic of Colombia, and residing at New York, in the county of New York and State of New York, have invented certain new and useful Improvements in Measuring-Funnels, of which the following is a specification.

My invention relates to funnels, and the main object is to provide means whereby the liquids passed therethrough may be accurately measured.

A further object is to provide a valve whereby said funnel may be closed against the passage of liquids therethrough.

A further object is to provide means for actuating said valve from open to closed position after any desired quantity of liquid has been passed through said funnel; and further objects are to provide such measuring funnels which are simple in construction, positive in operation, and comparatively inexpensive.

My invention is fully described in the following specification, of which the accompanying drawings form a part, in which the separate parts are designated by the same reference characters in each of the views, and in which:—

Figure 2:
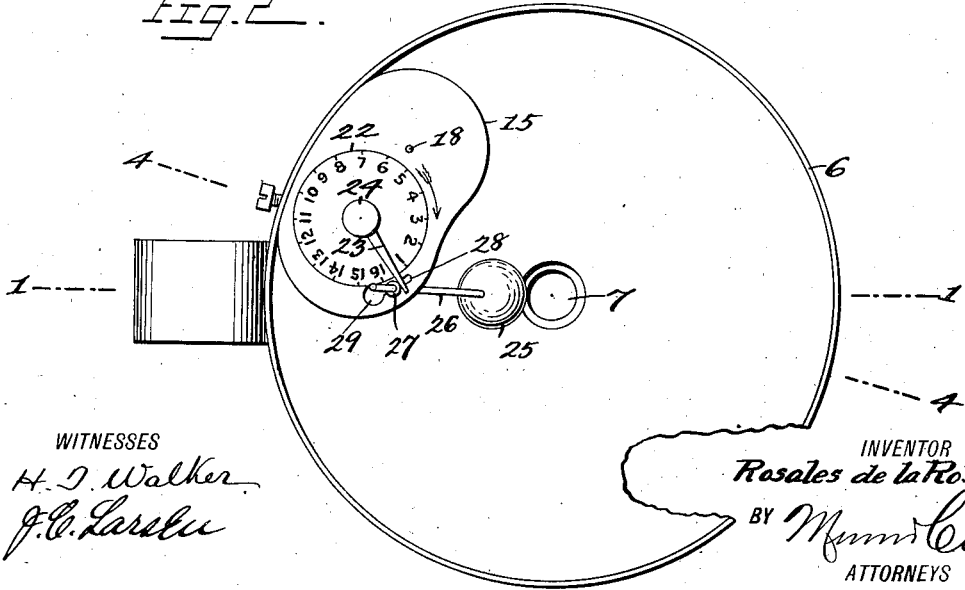

Figure 1 is a side elevation of a funnel constructed in accordance with my present invention, partly in section; Fig. 2 is a top plan view thereof; Fig. 3 is a section taken on the line 3—3 of Fig. 1; Fig. 4 is a section taken on the line 4—4 of Fig. 2; and Fig. 5 is a section taken on the line 5—5 of Fig. 4.

In the drawings forming a part of this application I have illustrated one form of embodiment of my invention, comprising a conical body portion 6 having an open top and a port 7 at the bottom thereof, said body portion being connected with a casing 8 having a tubular outlet 9 at the bottom thereof, adapted to enter the neck of a bottle or other vessel.

Within the casing 8 is a shaft 10 having a turbine 11 secured thereto beneath the port 7, said turbine having a plurality of pockets in the periphery thereof and being directly over the outlet 9; said shaft 10 also carries a pinion 12 at the end opposite the turbine and which is enmeshed with a gear 13 on a vertical shaft 14 extended through the casing 8 and body portion 6 and to a small casing 15 arranged within said body portion, at the top thereof, and within which is a pinion 16 secured to the upper end of said shaft 14.

The pinion 16 is enmeshed with a relatively large gear 17 upon a shaft 18 and which also carries a finger 19 at a point over said gear, and it will be seen that, when liquid passes through the funnel, the turbine is revolved, as is also the finger 19, the relative speeds of such revolutions being determined by the ratio of the gears and pinions, but I prefer to revolve the finger 19 at a much slower speed than that of the turbine, this relationship being calculated and depending upon the amount of liquid carried through the funnel in each revolution of the turbine.

Arranged in the top of the casing 15 is a shaft 20, directly over the shaft 14 in the form shown, and which has a plurality of radial arms 21 secured thereto in the horizontal plane of the finger 19 and adapted to be successively struck thereby to rotate said shaft 20 through an arc of a circle corresponding to the distance between the arms 21 at their outer ends, this also being a matter of calculation. Upon the upper surface of the casing 15, in the position of the shaft 20, is a dial 22 having as many numerically indicated graduations thereon as there are arms 21, in the form illustrated, and I also secure an indicator 23 upon the shaft 20, over the dial 22, and a knurled button 24 whereby said shaft may be manually rotated to move the indicator to the position of any one of the graduations on said dial.

Loosely arranged within the body portion 6 is a ball valve 25 having an upwardly extending stem 26 secured thereto, which stem passes through the casing 15 and has a washer 27 thereon resting upon the upper surface of said casing, the top of said casing having a curved slot 28 therein of less width than the diameter of said washer to prevent said washer from passing through the top of said casing, and thus maintaining the ball valve 25 in raised and inoperative position, and the slot 28 terminates in an enlarged opening which readily permits said washer to pass therethrough when the stem 26 is moved along said slot to said opening 29, and the ball valve is thus permitted to drop to its seat to close off the funnel, the upper end of said stem being arranged in the path of the indicator 23.

In practice, the valve is raised and the stem thereof moved to the small end of said slot 28 with the washer 27 above the casing, the indicator 23 having been previously set at a desired, numbered, graduation of the dial; assuming each graduation to represent one gallon, and that one pint of liquid will revolve the turbine once; it will thus require eight revolutions of the turbine to revolve the shaft 18 once, and to have the finger 19 thereon rotate the shaft 20, through the medium of one of the arms 21, through an arc of a circle which carries the indicator from one graduation to another, toward the valve stem 26; if the indicator had been set at 10, it would require ten actuations of the shaft 20 to have the indicator move the stem 26 to the opening 29 to permit the washer 27 to pass therethrough, this requiring eighty complete revolutions of the turbine, and the funnel thus automatically closes when ten gallons have passed through the funnel. It will thus be seen that the number of gallons passed through the funnel is determined by the dial graduation to which the indicator is moved to set the device, but these graduations might as well be quarts, pints, half-pints, gills, or any other desired amount, the ratio of the gears being the determining factor with a fixed quantity of liquid to revolve the turbine once.

My invention is especially valuable in measuring spirits, gasolene, etc., but it may be employed for any desired purpose or purposes, but, not only is the dial in such position as to enable the device to be set for a predetermined quantity of liquid, said dial is also so positioned that a purchaser of the liquid funneled may readily see if he is being given the full amount.

While I have shown one form of embodiment of the principle of my invention, I do not limit myself thereto, but may make changes thereover, within the scope of the following claims, without departing from the spirit of my invention or sacrificing its advantages.

Having fully described my invention, what I claim as new, and desire to secure by Letters Patent, is:—

1. A funnel provided with a spout, a turbine within said spout, a plate on said funnel, a gravity valve provided with a stem projected through and normally suspended from said plate, a dial on said plate, an indicator finger movable thereover and extended to engage with said stem to release the same from said plate, and means joining said turbine and indicator finger to move the latter over said dial to disengage said stem from said plate to permit said valve to drop in the revolution of said turbine by the liquid passing through said spout.

2. A funnel provided with a spout, a turbine in said spout, a plate on said funnel, a dial thereon, said plate having a slot adjacent said dial enlarged at one end, a gravity valve having a stem projected through said slot and normally suspended from said plate, an indicating finger movable over said dial and extended to pass over said slot in its movement, and means joining said turbine and indicating finger whereby, in the revolution of said turbine by the liquid passing through said spout, said finger will engage with said stem and release the same from said plate to permit said valve to drop to its seat.

In testimony whereof I have signed my name to this specification in the presence of two subscribing witnesses.

ROSALES DE LA ROSA.

Witnesses:
J. C. LARSEN,
PHILIP D. ROLLHAUS.